3,299,473
ADJUSTABLE SCREW MELTER HEATER

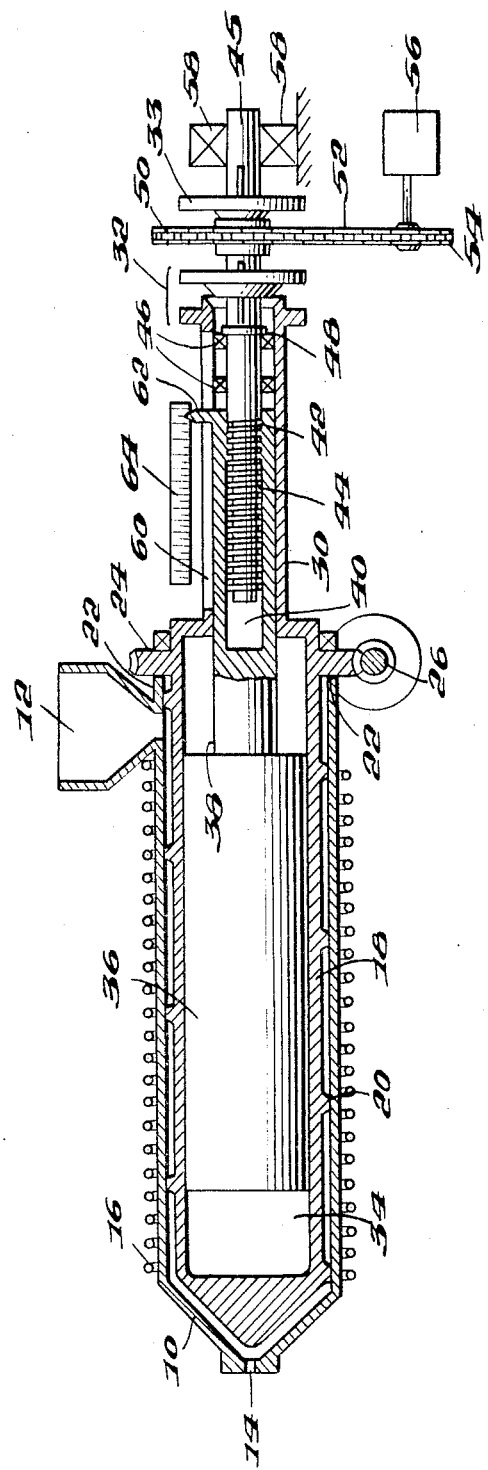

Ellis W. Rorer, Seaford, Del., and Abraham Scheinfeld, Philadelphia, Pa., assignors to E. I. du Pont de Nemours and Company, Wilmington, Del., a corporation of Delaware
Filed Aug. 14, 1964, Ser. No. 389,546
5 Claims. (Cl. 18—12)

This invention relates generally to melt extrusion and, more particularly, to improvements in apparatus for heating the extrusion screw in a melt extrusion machine.

In the preparation of shaped and molded products, for example, from solid particulate synthetic thermoplastic polymers, it is well known to heat the polymer flake and to transfer the molten polymer under pressure. Screw extruders frequently called screw melters, such as disclosed by Livingston and Treadwell in U.S. Patent No. 3,055,053 are generally very satisfactory. In some cases, however, such as when the rate of polymer throughput or the melting characteristics of the polymer are changed during an extended length of processing time, it has been found advantageous to vary the temperature contour along the screw without interrupting the operation of the screw melter. In this way the operating characteristics may be optimized for each new polymer batch or throughput demand and polymer degradation and gel formation minimized.

The primary object of the present invention is to enable altering temperature contour along the screw of a screw melter without first stopping or changing screw speed.

A second object is to enable optimization of screw temperature contour for any of widely differing polymer batches.

These objects are achieved by this invention which comprises a screw melter having a rotatable extrusion screw, a heater assembly slidably mounted within an internal bore in the screw, and adjusting means constructed and arranged to adjust the axial position of the heater assembly without modifying the rotational motion of the extrusion screw. The heater assembly may or may not be rotatable with said extrusion screw, as desired.

Other objects will become apparent from the following description of the preferred embodiments of the invention wherein reference is made to the accompanying drawing in which:

The figure is a longitudinal sectional view of a screw melter with an adjustable heater made in accordance with the teachings of this invention.

The embodiment shown, for illustration of this invention, has the heater rotatable with the extrusion screw. It is seen to include as components thereof a screw melter housing 10 having a hopper 12 for introduction of feed and an extrusion hole 14 which may be linked to apparatus for further processing of the extrudate. Inside and coaxial with housing 10 is an extrusion screw 18 having a helical land 20 on its outer surface. Screw 18 is driven by means of a large screw drive gear 24 mounted on the screw at a location in back of the hopper. Gear 24 is driven by worm 26 which in turn is driven by a means such as an electric motor of conventional design. Between drive gear 24 and rear end of housing 10 there is located a seal 22 to prevent feed material from escaping at the rear of the housing and screw. An elongated cylindrical screw extension housing 30 is attached to the rear end of the screw 18 and has attached to its free end a clutch 32, the purpose of which will be described below. Mounted in frictional slidable engagement in an internal axial bore 34 in screw 18 is a heater 36 mounted on one end of shaft 38 which has at the free end thereof an adjusting nut 40 fitting inside screw extension 30 and coaxial therewith. Adjusting nut 40 has screw threads 42 inside its internal bore which extends inwardly from the free end of the shaft 38. In threaded engagement with the bore of said shaft 38 is adjusting screw 44 coaxial with screw extension 30 and having an elongated cylindrical extension 45 mounted in bearings 46. One half of clutch 32 is mounted on screw extension 30, the other half mounted on extension 45 of adjusting screw 44. Clutch 32 is normally engaged such that adjusting screw 44 normally rotates with screw extension 30. Thrust bearing 48 prevents axial motion of adjusting screw 44 relative to screw extension 30. On extension 45 of adjusting screw 44 is sprocket 50 and a second clutch 33, the sprocket 50 being linked by chain 52 to a second sprocket 54 mounted on the drive shaft of motor 56. Clutches 32 and 33 are arranged by conventional means (not shown) such that when either one engages extension 45 it automatically disengages the other clutch. Motor 56 has conventional speed control means (not shown). The end of adjusting screw extension 45 is mounted in bearing 58 which in turn is mounted on the main frame of the melt extrusion apparatus. A slot 60 is cut in screw extension 30 to receive an indexing pin 62 mounted on the end of adjusting nut 40. A scale 64 is mounted above indexing pin 62 to show the position of the heater assembly within the main screw 18. External heaters 16 mounted around the outside of housing 10 complete the apparatus.

In operation, the material to be extruded is fed in hopper 12 after heaters 16 and 36 have been energized to bring the apparatus up to temperature desired. Screw 18 and thus heater 36 are rotated by means of drive gear 24 and driven worm 26. Clutch 32 is normally engaged and clutch 33 disengaged such that the complete adjusting assembly comprising nut 40 and adjusting screw 44 rotate in complete synchronism with extrusion screw 18 and its extension 30.

Now if it is found that the temperature contour along the length of screw 18 is not satisfactory as indicated either by thermocouples mounted within the screw (not shown) or as evidenced by processing characteristics of the extrudate, the position of heater 36 may be adjusted as follows.

Clutch 32 is disengaged and clutch 33 is engaged so that adjusting screw 44 is rotated independently by motor 56, thus allowing relative rotation between adjusting screw 44 and adjusting nut 40.

This relative motion is accomplished by adjusting the speed of motor 56 driving sprocket 54, chain 52 and sprocket 50 at such a speed to either drive adjusting nut 40 and its attached heater assembly farther into bore 34 or withdrawing the heater assembly toward the right as shown. When the position of heater 36 has been adjusted, clutch 33 is disengaged, clutch 32 is engaged and the adjusting assembly again rotates in synchronism with the screw thus maintaining the heater at the adjusted position.

Energy to heater 36 is introduced through a slip ring assembly of conventional design and therefore not shown. The design of heater assembly 36 may be any of several conventional designs including the fixed profile assembly disclosed by Livingston and Treadwell in the patent cited above or may be variable profile assemblies wherein each of several individual heaters located along the length of the heater assembly is connected through separate slip ring assemblies. The heat input of each heater may therefore be separately regulated.

For the alternative embodiment, when it is not desired to have the heater assembly 36 rotate with the extrusion screw 18, the apparatus shown is slightly modified. There is allowed a slight clearance between heater assembly 36 and the bore of extrusion screw 18 so that said assembly is not rotated by frictional contact with the bore.

Clutches 32 and 33 are eliminated and sprocket 50 is mounted on extension 45 of the adjusting screw 44. Motor 56 is of the reversing type so that adjusting screw may be rotated in either direction independently of extrusion screw 18 to slide heater assembly 36 forward or backward as desired. Indexing pin 62 and scale 64 are removed and the extension 40 of shaft 38 is calibrated to determine the position of heater assembly 36.

In operation, motor 56 is normally turned off so that only extrusion screw 18 rotates. When it is desired to shift the position of elongated heater assembly 36, motor 56 is turned on to rotate adjusting screw 44 clockwise or counterclockwise as desired, thus sliding heater assembly 36 forward or backward without modifying the rotational motion of extrusion screw 18. When the heater is in the desired position, motor 56 is turned off and the heater remains in its adjusted position.

As can be seen from the foregoing description, this invention has the advantage over the prior art of allowing changes in heater location to alter temperature contour along the extrusion screw without first stopping or changing the speed of said screw.

It is apparent that other changes and modifications may be made without departing from the spirit of the present invention which is therefore intended to be limited only by the scope of the following appended claims.

What is claimed is:

1. In combination: a screw melter having a rotatable extrusion screw, said screw having an internal axial bore, an electrical heater assembly mounted within said bore, and adjusting means for adjusting the axial position of said heater assembly without modifying the rotational motion of said screw.

2. In a screw melter, a rotatable extrusion screw having an internal bore, an electrical heater assembly slidably mounted within said bore, an elongated shaft on one end of which is mounted said heater assembly in axial alignment therewith, said shaft having an internally threaded bore extending inwardly from its free end, an elongated adjusting screw one end of which is in threaded engagement with the threads of the bore in said elongated shaft, means maintaining said adjusting screw in a substantially fixed axial position whereby said heater assembly axially slides within the bore of said extrusion screw upon rotation of said adjusting screw, and mechanically-powered drive means to rotate said adjusting screw independently of said extrusion screw so that said heater assembly axially slides within the bore of said extrusion screw without modifying the rotational motion of said extrusion screw.

3. In combination: a screw melter having a rotatable extrusion screw, said screw having an internal axial bore, an electrical heater assembly slidably and rotatably mounted within said bore, and adjusting means for adjusting the axial position of said heater assembly without modifying the rotational motion of said screw and heater assembly.

4. In a screw melter, a rotatable extrusion screw having an internal bore, an electrical heater assembly slidably and rotatably mounted within said bore, an elongated shaft on one end of which is mounted said heater assembly, said shaft having an internally threaded bore extending inwardly from its free end, an elongated adjusting screw one end of which is in threaded engagement with the threads of the bore in said elongated shaft, means maintaining said adjusting screw in a substantially fixed axial position whereby said heater assembly axially slides within the bore of said extrusion screw upon relative rotation of said adjusting screw, first means to engage said adjusting screw to rotate synchronously with said extrusion screw and heater assembly, and second means to disengage said first means and rotate said adjusting screw independently of said extrusion screw so that the relative rotation between the adjusting screw and extrusion screw causes said heater assembly to axially slide within the bore of said extrusion screw without modifying the rotational motion of said extrusion screw and heater assembly.

5. Claim 4 wherein said first means comprises first clutch means for engaging said adjusting screw with said extrusion screw to rotate said adjusting screw synchronously with said extrusion screw and heater assembly, and said second means comprises second clutch means and drive means, said second clutch means to disengage said first clutch means and engage said adjusting screw with said drive means to rotate said adjusting screw independently of said extrusion screw.

References Cited by the Examiner

UNITED STATES PATENTS 2,641,800  6/1953  Meyers _____ 18—12

FOREIGN PATENTS 657,362  2/1963  Canada.

WILLIAM J. STEPHENSON, *Primary Examiner.*